United States Patent
Kumai et al.

(10) Patent No.: US 7,608,474 B2
(45) Date of Patent: Oct. 27, 2009

(54) METHOD FOR MANUFACTURING OPTICAL ELEMENT

(75) Inventors: Yoshitomo Kumai, Okaya (JP); Daisuke Sawaki, Suwa (JP)

(73) Assignee: Seiko Epson Corporation (JP)

( * ) Notice: Subject to any disclaimer, the term of this patent is extended or adjusted under 35 U.S.C. 154(b) by 168 days.

(21) Appl. No.: 11/353,346

(22) Filed: Feb. 14, 2006

(65) Prior Publication Data

US 2006/0185983 A1 Aug. 24, 2006

(30) Foreign Application Priority Data

Feb. 21, 2005 (JP) ............................. 2005-044293

(51) Int. Cl.
*H01L 21/00* (2006.01)
(52) U.S. Cl. ................ 438/65; 264/1.31; 427/163.1; 205/79; 438/48
(58) Field of Classification Search ................ 438/21, 438/48, 65; 205/191, 79; 257/E27.138, 143, 257/E21.175
See application file for complete search history.

(56) References Cited

U.S. PATENT DOCUMENTS

| | | | |
|---|---|---|---|
| 2,942,120 A * | 6/1960 | Kazan ................. 250/214 LA |
| 3,291,871 A | 12/1966 | Francis |
| 4,068,260 A * | 1/1978 | Ohneda et al. ............. 348/291 |
| 4,771,017 A * | 9/1988 | Tobin et al. ................. 438/98 |
| 4,915,463 A * | 4/1990 | Barbee, Jr. ................. 359/360 |
| 5,119,231 A * | 6/1992 | Nelson et al. ............. 359/359 |
| 5,148,260 A * | 9/1992 | Inoue et al. ................. 257/762 |
| 5,483,387 A | 1/1996 | Bauhahn et al. |
| 6,122,103 A | 9/2000 | Perkins |
| 6,243,199 B1 | 6/2001 | Hansen |
| 6,288,840 B1 * | 9/2001 | Perkins et al. ............. 359/486 |
| 6,336,753 B1 * | 1/2002 | Kihira et al. ................. 396/506 |
| 6,384,971 B1 * | 5/2002 | Faris ........................ 359/483 |
| 6,392,792 B1 * | 5/2002 | Naulleau .................... 359/360 |
| 6,532,111 B2 * | 3/2003 | Kurtz et al. ................. 359/486 |
| 6,631,022 B1 * | 10/2003 | Kihira et al. ............... 359/265 |
| 6,788,461 B2 * | 9/2004 | Kurtz et al. ................. 359/486 |
| 6,790,377 B1 | 9/2004 | Cohen |
| 6,809,864 B2 * | 10/2004 | Martynov et al. .......... 359/576 |
| 6,813,077 B2 * | 11/2004 | Borrelli et al. ............. 359/486 |
| 7,009,768 B2 * | 3/2006 | Sakamoto .................... 359/486 |
| 7,022,210 B2 * | 4/2006 | Tench .................... 204/290.14 |

(Continued)

FOREIGN PATENT DOCUMENTS

EP 0 985 510 A1 3/2000

(Continued)

OTHER PUBLICATIONS

European Extended Search Report for counterpart application.

(Continued)

*Primary Examiner*—Thao X Le
*Assistant Examiner*—Eric W Jones
(74) *Attorney, Agent, or Firm*—Harness, Dickey & Pierce, P.L.C.

(57) ABSTRACT

A method for manufacturing an optical element having a metal wire grid containing a plurality of metal wires on a substrate includes forming the metal wire grid using an electrolytic plating process.

2 Claims, 4 Drawing Sheets

U.S. PATENT DOCUMENTS

| | | | |
|---|---|---|---|
| 7,046,442 B2 * | 5/2006 | Suganuma | 359/486 |
| 7,113,335 B2 * | 9/2006 | Sales | 359/486 |
| 7,158,302 B2 * | 1/2007 | Chiu et al. | 359/486 |
| 7,220,371 B2 * | 5/2007 | Suganuma | 264/1.31 |
| 7,227,145 B2 * | 6/2007 | Brouns | 250/338.1 |
| 7,268,946 B2 * | 9/2007 | Wang | 359/569 |
| 7,304,719 B2 * | 12/2007 | Albert et al. | 355/71 |
| 7,480,017 B2 * | 1/2009 | Fisher et al. | 349/96 |
| 2003/0096123 A1 * | 5/2003 | Yeager | 428/461 |
| 2003/0122468 A1 * | 7/2003 | Cho et al. | 313/309 |
| 2003/0135979 A1 | 7/2003 | Nishi | |
| 2004/0008416 A1 * | 1/2004 | Okuno | 359/566 |
| 2004/0125449 A1 | 7/2004 | Sales | |
| 2004/0264350 A1 | 12/2004 | Ueki et al. | |
| 2005/0088739 A1 * | 4/2005 | Chiu et al. | 359/486 |
| 2005/0205884 A1 * | 9/2005 | Kim et al. | 257/98 |
| 2006/0118514 A1 * | 6/2006 | Little et al. | 216/41 |
| 2007/0152358 A1 | 7/2007 | Suganuma | |
| 2007/0199735 A1 * | 8/2007 | Kim et al. | 174/255 |
| 2008/0145568 A1 * | 6/2008 | Lee et al. | 427/595 |

FOREIGN PATENT DOCUMENTS

| | | |
|---|---|---|
| EP | 1 277 571 A1 | 1/2003 |
| GB | 648257 | 1/1951 |
| GB | 702851 | 1/1954 |
| JP | 2001-074935 | 3/2001 |
| JP | 2003-502708 | 1/2003 |
| JP | 2003-508813 | 3/2003 |
| JP | 2003-158373 | 5/2003 |
| JP | 2004-335710 | 11/2004 |
| JP | 2004-343109 | 12/2004 |
| JP | 2005-070456 | 3/2005 |
| KR | 2003-0007464 | 1/2003 |
| KR | 10-2004-0062536 | 7/2004 |
| KR | 10-2004-0095631 | 11/2004 |
| KR | 10-2004-0098085 | 11/2004 |
| WO | WO 01-68951 | 9/2001 |

OTHER PUBLICATIONS

Communication from Taiwanese Patent Office regarding counterpart application.

European Extended Search Report for counterpart application, Apr. 20, 2006.

* cited by examiner

METHOD FOR MANUFACTURING OPTICAL ELEMENT

CROSS-REFERENCES TO RELATED APPLICATIONS

The entire disclosure of Japanese Patent Application No. 2005-044293, filed on Feb. 21, 2005, is expressly incorporated herein by reference.

BACKGROUND

1. Technical Field

The present invention relates to a method for manufacturing an optical element, specifically, a wire grid polarizer for visible spectrum light.

2. Related Art

Conventionally, various optical elements, e.g., wide band wire grid polarizers that effectively transmit certain polarized light and reflect polarized light that runs perpendicular to that light, have been being developed as disclosed in JP-T-2003-502708 and others.

In inorganic polarizers that are currently in practical use, after resist patterning being performed on a substrate, dry etching is performed using RIE (Reactive Ion Etching) or the like to form a metal embossed pattern. However, when forming an embossed pattern on the nano-order, it is necessary to strictly control the etching parameter, so it has been difficult to manufacture a highly-accurate polarizer at a high yield. Therefore, there has been a demand for manufacturing an optical element, such as a polarizer, that is more inexpensive, highly-accurate, and capable of being mass-produced in greater quantities.

SUMMARY

An advantage of some aspects of the invention is to provide an optical element, such as a polarizer, that is more inexpensive, highly-accurate, and capable of being mass-produced in greater quantities.

According to an aspect of the invention, provided is a method for manufacturing an optical element having a metal wire grid containing a plurality of metal wires on a substrate, comprising forming the metal wire grid using an electrolytic plating process.

It is preferable that the electrolytic plating process is an electrodeposition process using a plating bath.

It is preferable that a multi-layered metal wire grid is formed as the metal wire grid, by performing the electrolytic plating process to form a first layer of the metal wires, and thereafter repeating the electrolytic plating process or a non-electrolytic plating process at least one more time.

It is preferable that a multi-element metal wire grid is formed as the metal wire grid by using two or more kinds of metal.

It is preferable that a metal to be grown via the electrolytic plating process includes one or more kinds of metal selected from the group consisting of Al, Ag and Au.

It is preferable that a visible spectrum light polarizer is manufactured as the optical element.

DESCRIPTION OF EXEMPLARY EMBODIMENTS

Hereinafter, preferred embodiments of the method for manufacturing an optical element according to the invention are explained. However, the invention is not limited in any way to those embodiments.

Embodiment 1

FIG. 1 shows one example of the steps for manufacturing a visible spectrum light polarizer according to this embodiment.

1. Film Formation of a Transparent Electrode Layer

Figure 1A:
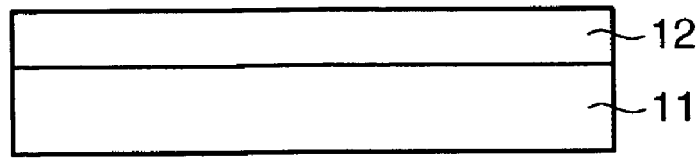
FIG. 1 is a process chart showing one example of a method for manufacturing a polarizer for visible spectrum light.

As shown in FIG. 1A, a film of a transparent electrode layer (such as ITO) 12 is formed on a glass substrate 11 of quartz or similar.

2. Resist Patterning

Figure 1B:
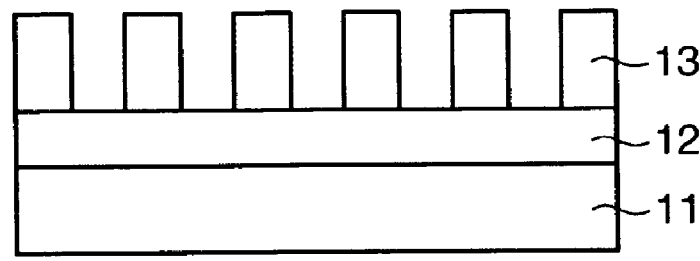

As shown in FIG. 1B, a resist 13 is patterned on the transparent electrode layer 12 using an ordinary method. The resist 13 is formed in the shape of plural ribs arranged in parallel so that concave grooves are formed between them.

3. Electrolytic Plating

Figure 1C:
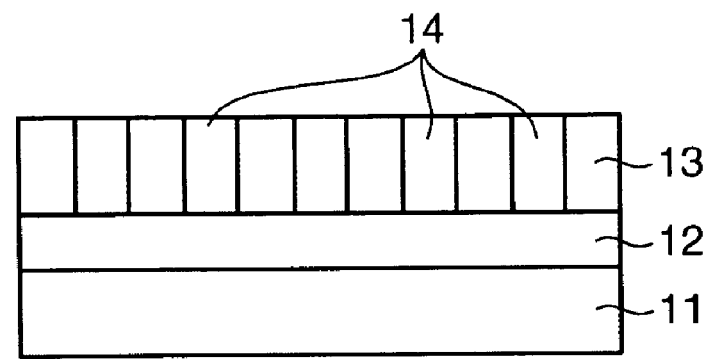

Subsequently, as shown in FIG. 1C, an Al metal layer 14 is grown via electrolytic plating in the concave parts formed as a result of the patterning of the resist 13. In the electrolytic plating, one can set any conditions suitable for mass-producing a highly-accurate polarizer in greater quantities. One example of an electrolytic plating process performed here includes an electrodeposition process using a plating bath 20 shown in FIG. 2.

Figure 2:
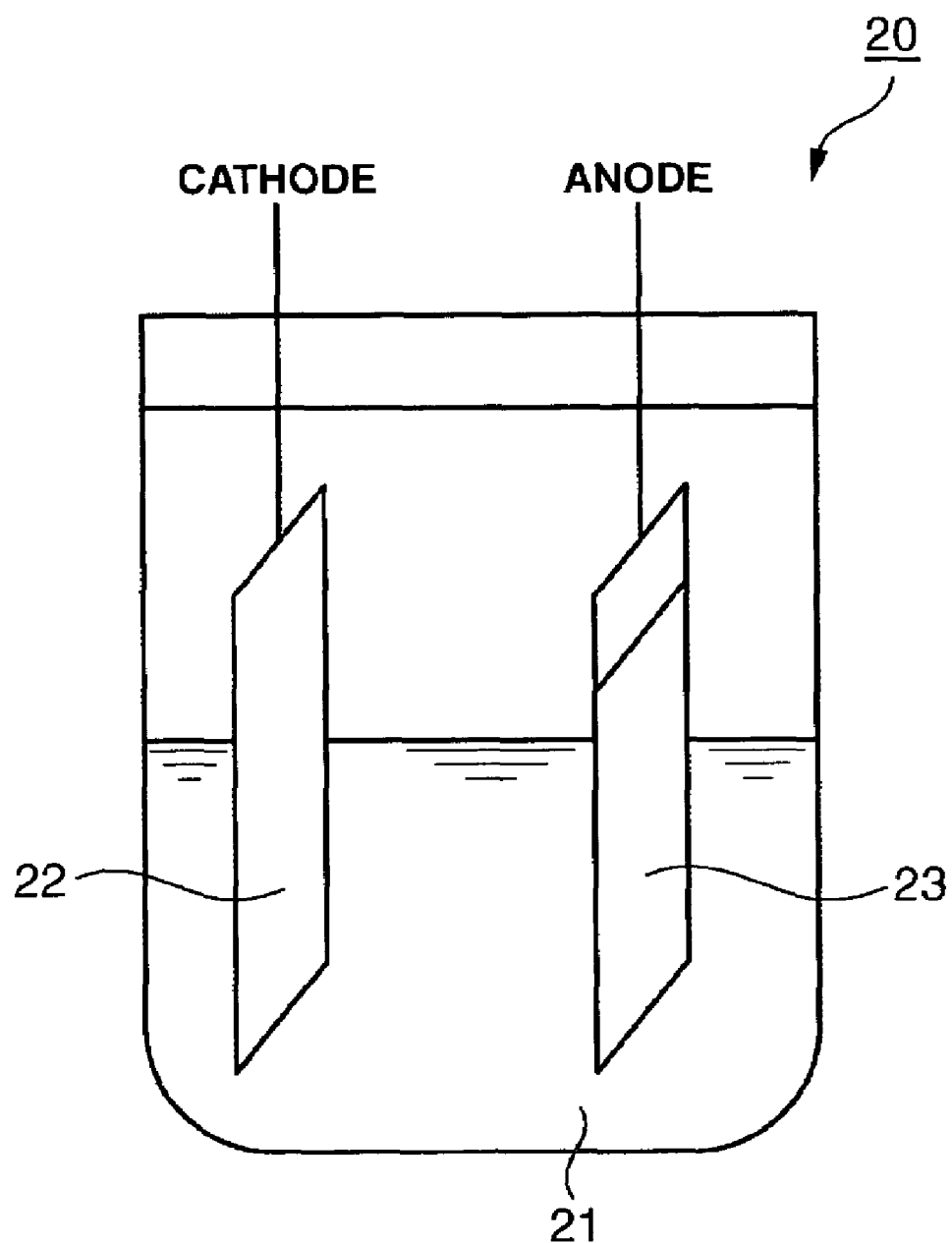
FIG. 2 is a schematic view of a plating bath used for performing an electrolytic plating process.

As shown in FIG. 2, the plating bath 20 is composed of: a solution 21 of a mixed salt of $AlCl_3$ and an organic chloride; a cathode 22 as a substrate for the electrodeposition of Al; and an anode 23 made of Al.

Examples of the organic chloride contained in the mixed salt in the solution 21 include BPC (1-butylpyridinium chloride) and EMIC (1-ethyl-3-methylimidazolium chloride).

The substrate constituting the cathode 22 is a substrate for the electrodeposition of Al, and the above-explained one, i.e., a glass substrate 11 of quartz or similar with a film of a transparent electrode layer (such as ITO) 12 formed thereon and also with a specific resist 13 (not shown in FIG. 2), is used as that substrate.

There is no particular limitation on the material constituting the anode 23 so long as it has electrical conductivity, but it is preferable that it be the same material as the electrodeposition target metal. So, in this embodiment, the anode is preferably made of metal composed of Al, which is the same kind of metal constituting the cathode. The material for the anode is not limited to the metal described above, and it may be any conductive material such as carbon material.

One example of the electordeposition conditions is as follows: current density: 5 to 30 mA cm$^{-2}$; bath temperature: 20 to 25° C.; power distribution: 10 to 50 C·cm$^{-2}$; and inter-electrode distance: 1 to 10 cm.

4. Resist Removal and Wire Grid Formation

Figure 1D:
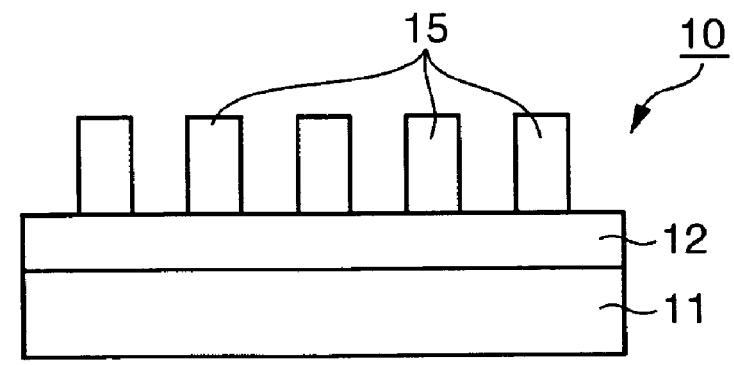

After the metal layer 14 is grown, the resist 13 is removed and a metal wire grid 15 is obtained, as shown in FIG. 1D. As a result, a polarizer 10, being a highly-accurate optical element having the metal wire grid 15, can be inexpensively mass-produced in greater quantities.

Embodiment 2

FIG. 3 shows another example of the steps for manufacturing a visible spectrum light polarizer according to this embodiment.

1. Film Formation of a Transparent Electrode Layer

Figure 3A:
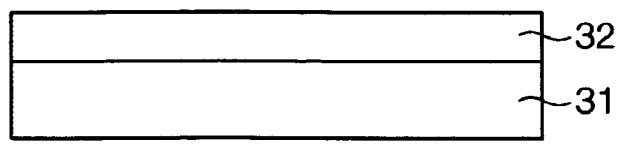
FIG. 3 is a process chart showing another example of a method for manufacturing a polarizer for visible spectrum light.

As shown in FIG. 3A, a film of a transparent electrode layer (such as ITO or Zno) 32 is formed on a glass substrate 31 of quartz or similar.

2. Resist Patterning

Figure 3B:
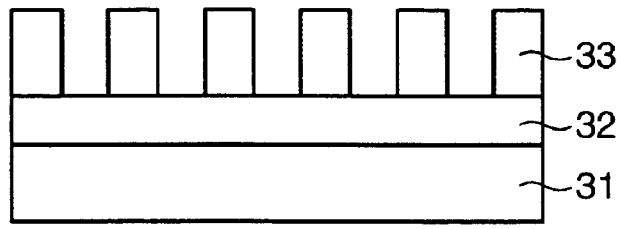

As shown in FIG. 3B, a resist 33 is patterned on the transparent electrode layer 32 using an ordinary method. The resist 33 is formed in the shape of plural ribs arranged in parallel so that convex grooves are formed between them.

3. Electrolytic Plating and Formation of a First Metal wire Layer

Figure 3C:
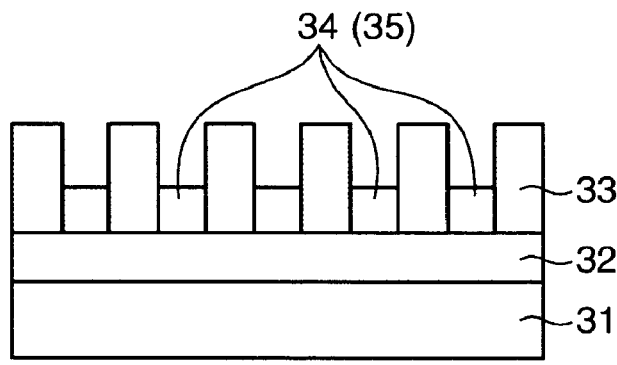

Subsequently, as shown in FIG. 3C, a metal layer 34 as a first layer is grown via electrolytic plating in the concave parts formed as a result of the patterning of the resist 13. In the electrolytic plating, one can set any conditions suitable for mass-producing a highly-accurate polarizer in greater quantities. One example of an electrolytic plating process performed here includes an electrodeposition process using a plating bath as explained in detail in Embodiment 1 (shown in FIG. 2). With this kind of electrolytic plating, the metal layer 34 is grown to form a first metal wire layer 35 of a metal wire grid.

4. Multilayer Metal Wire Grid Formation

Figure 3D:
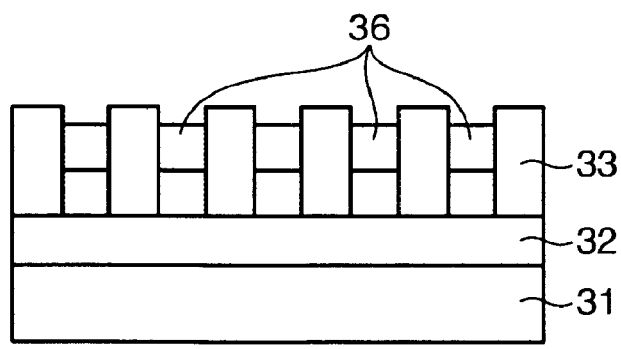

After the first metal wire layer 35 of the metal wire grid is formed via the electrolytic plating, the electrolytic plating or non-electrolytic plating is repeatedly performed at least one more time until a configuration having the desired number of metal wire layers is obtained, as shown in FIG. 3D. As a result, a metal wire grid 36 with a desired-number-layer configuration is formed. FIG. 3D shows the metal wire grid 36 with a configuration having two metal wire layers, each of different metal such as Al and Ag. There is no particular limitation on the kinds of metal or the number of layers.

5. Resist Removal

Figure 3E:
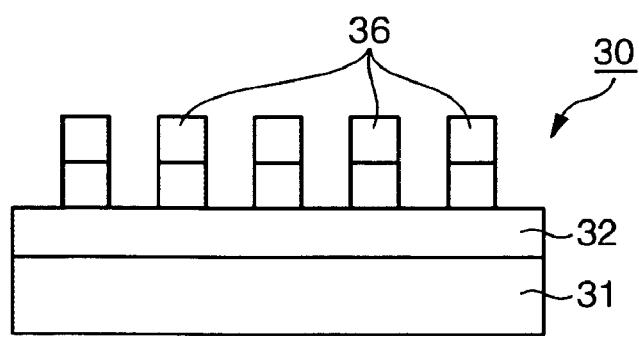

As shown in FIG. 3E, by removing the resist 33, a polarizer 30, being a highly-accurate optical element having the metal wire grid 36, can be inexpensively mass-produced in greater quantities.

Embodiment 3

Figure 4A:
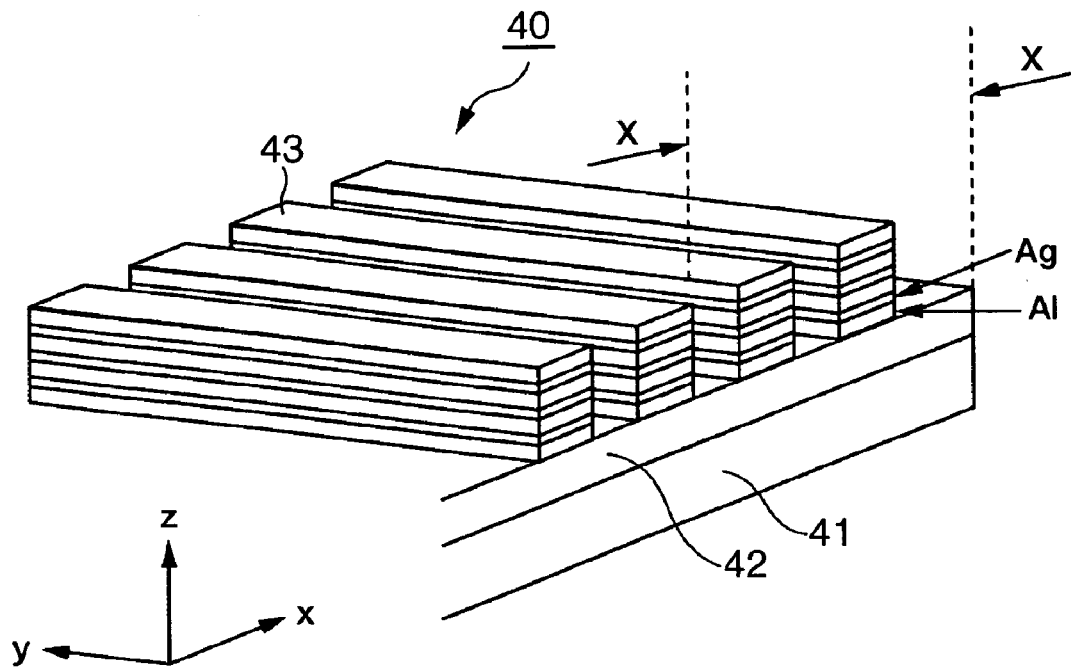
FIG. 4 shows one example of a polarizer for visible spectrum light, having a metal wire grid containing seven metal wire layers made of two kinds of metal.
Figure 4B:
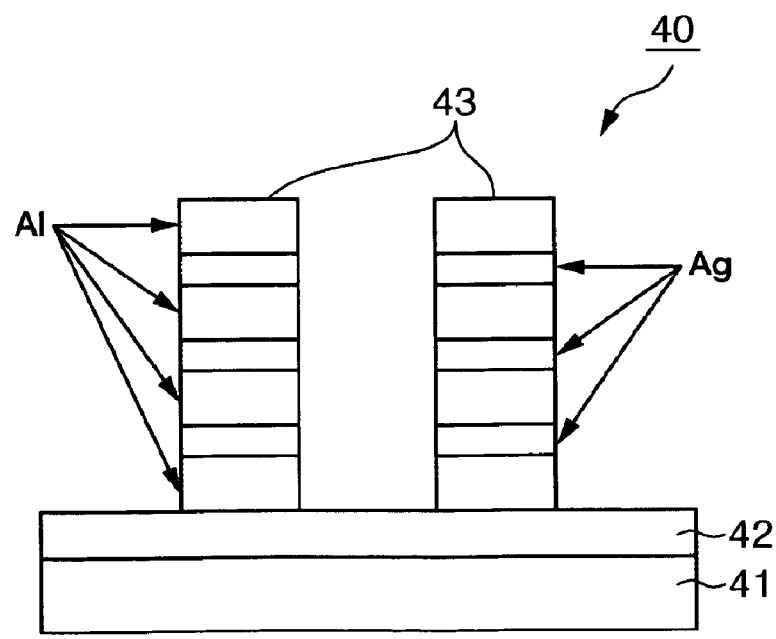

Next, an embodiment is explained where two kinds of metal, Al and Ag, are used as the target metals to be grown by the electrolytic plating process, and a seven-layer wire grid is formed by the electrolytic plating process. FIG. 4 shows one example of a visible spectrum light polarizer having a wire grid composed of two kinds of metal (layered metal alloy), which is formed using the manufacturing method according to this embodiment. FIG. 4A is a perspective view of the polarizer according to Embodiment 3, and FIG. 4B is a cross sectional view of the polarizer in FIG. 4A along the X-X line.

A polarizer manufacturing method according to this embodiment is composed of the same steps as those in the above-described Embodiments 1 and 2, except for forming seven metal wire layers by alternately using two kinds of metal, Al and Ag, as the target metals to be grown by the electrolytic plating process. Thus, for points not specifically explained in this Embodiment 3, the content explained above in Embodiments 1 and 2 applies as appropriate.

In this embodiment, after patterning a resist on a transparent electrode layer 42 formed on a glass substrate 41, electrolytic plating is performed alternately with Al and Ag. As a result, when the resist is removed, a polarizer 40, being a highly-accurate optical element having a metal wire grid 43 consisting of a plurality of alternately layered Al and Ag metal wire layers (i.e., a multi-element and multi-layered metal wire grid), can be easily and inexpensively mass-produced in greater quantities.

Modification

The invention provides the above-described preferred embodiments. However, the invention is not limited to those embodiments, and various modifications may be made without departing from the spirit of the invention.

Besides Al and Ag, Au may be preferably used for the metal for forming the metal wire grid, and a combination of those metals may also be used. In addition, a solid solution or an intermetallic compound of Al and Ag may also be used.

In the above-described embodiments, a visible spectrum light polarizer is manufactured as an optical element, but the invention may be applied to a diffraction grating or similar.

According to the invention, an optical element, such as a polarizer, that is highly-accurate and capable of being mass-produced in greater quantities can be obtained at low cost by forming a metal wire grid in the optical element using an electrolytic plating process. Also, a multi-element and multi-layered metal wire grid can be formed easily, which widens the scope for material selection.

The invention is industrially applicable as a method for manufacturing an optical element, such as a polarizer, that is capable of being mass-produced in greater quantities at low cost.

What is claimed is:

1. A method for manufacturing an optical element, comprising:

forming plural linear resist films arranged at equal intervals on a transparent electrode layer formed on a glass substrate;

performing a process of forming a first metal layer made of a first metal by an electrolytic plating process and then forming a second metal layer made of a second metal by an electrolytic plating process or non-electrolytic plating process, thereby forming the first metal and second metal alternately on each other between the resist films; and removing the resist films to leave a wire grid in which the first metal and second metal are alternately formed, wherein the first metal is a different metal than the second metal, and wherein the process of forming the first metal layer and then forming the second metal layer is performed at least twice until a configuration having a desired number of the first and second metal layers is obtained.

2. The optical element manufacturing method according to claim 1, wherein the first metal is Al and the second metal is Ag.

* * * * *